(12) United States Patent
Olivieri

(10) Patent No.: US 10,039,960 B2
(45) Date of Patent: Aug. 7, 2018

(54) GOLF BALL SCOOP

(71) Applicant: Janet Louise Olivieri, Dansville, NY (US)

(72) Inventor: Janet Louise Olivieri, Dansville, NY (US)

( * ) Notice: Subject to any disclaimer, the term of this patent is extended or adjusted under 35 U.S.C. 154(b) by 0 days.

(21) Appl. No.: 15/048,855

(22) Filed: Feb. 19, 2016

(65) Prior Publication Data

US 2017/0239531 A1 Aug. 24, 2017

(51) Int. Cl.
*H01L 21/677* (2006.01)
*A63B 47/02* (2006.01)
*B25J 1/04* (2006.01)

(52) U.S. Cl.
CPC ............... *A63B 47/02* (2013.01); *B25J 1/04* (2013.01)

(58) Field of Classification Search
CPC .................................. A63B 47/02; B25J 1/04
USPC ......... 414/800; 294/19.2; 473/132, 134, 137
See application file for complete search history.

(56) References Cited

U.S. PATENT DOCUMENTS

| | | | |
|---|---|---|---|
| 713,672 A * | 11/1902 | Oliver | A63B 47/02 294/19.2 |
| 1,937,180 A * | 11/1933 | Young | A63B 57/0006 221/298 |
| 1,937,828 A * | 12/1933 | MacDonald | A63B 47/02 294/19.2 |
| 2,058,709 A | 12/1936 | Molinare | |
| 2,516,622 A * | 7/1950 | George | A01D 46/247 294/19.2 |
| 2,551,486 A * | 5/1951 | Burden | A63B 47/02 16/426 |
| 2,962,321 A | 11/1960 | Fowler et al. | |
| 3,117,814 A * | 1/1964 | Webb | A63B 47/02 294/19.2 |
| 3,316,008 A * | 4/1967 | Baugh, Jr. | A63B 47/02 294/19.2 |
| 3,901,545 A | 8/1975 | Shott | |
| 3,982,781 A * | 9/1976 | Tucker | A63B 47/02 294/19.2 |
| 4,045,068 A | 8/1977 | Nelson | |
| 4,058,336 A | 11/1977 | Parkinson | |
| 4,063,769 A * | 12/1977 | Zimmer | A63B 47/02 294/19.2 |
| 4,078,838 A * | 3/1978 | Nadratowski | E01H 1/12 294/1.4 |
| 4,088,251 A | 5/1978 | Rodriguez | |
| 5,165,744 A * | 11/1992 | Vogrin | A63B 57/0037 294/19.2 |
| 5,395,146 A | 3/1995 | Liu et al. | |
| 5,433,491 A | 7/1995 | Green | |
| 5,460,366 A * | 10/1995 | Pugh | A63B 47/02 294/19.2 |
| 5,466,027 A | 11/1995 | Hockey | |
| 5,476,297 A | 12/1995 | Lombard | |
| 5,575,520 A * | 11/1996 | Northcutt | E01H 1/1206 141/108 |

(Continued)

*Primary Examiner* — Basil Katcheves
(74) *Attorney, Agent, or Firm* — Lynne M. Blank, Esq.

(57) ABSTRACT

The present invention relates to a ball scoop device comprising a hollow transport shaft connected by a lower angled connection to a ball scoop at the lower end of the transport shaft and connected by an upper angled connection at the upper end of the transport shaft to a ball retainer and a method for using the same.

10 Claims, 7 Drawing Sheets

(56) References Cited

U.S. PATENT DOCUMENTS

| | | | | |
|---|---|---|---|---|
| 5,639,133 | A | * | 6/1997 | Mote ........................ A63B 47/02 206/315.9 |
| 5,755,632 | A | | 5/1998 | Eddy |
| 5,775,751 | A | | 7/1998 | Nelson |
| 5,975,600 | A | * | 11/1999 | Hwang .................... A63B 47/02 221/199 |
| 6,199,926 | B1 | * | 3/2001 | Lemoine ............... A63B 47/002 221/310 |
| D445,469 | S | * | 7/2001 | Loerop ......................... D21/721 |
| 6,419,600 | B1 | * | 7/2002 | York ..................... A63B 47/002 294/19.2 |
| 6,824,179 | B1 | | 11/2004 | Shelato |
| D533,689 | S | * | 12/2006 | Borngesser .................. D30/162 |
| 7,165,796 | B1 | | 1/2007 | Hung |
| 7,398,888 | B1 | * | 7/2008 | Nowak ............... A63B 71/0036 206/315.9 |
| 7,479,076 | B2 | | 1/2009 | Verga |
| 7,506,781 | B2 | * | 3/2009 | Roberts ................ A63B 47/002 221/151 |
| 7,922,608 | B1 | | 4/2011 | Shoham |
| 7,963,854 | B2 | * | 6/2011 | Nugent ................... A63B 55/20 221/194 |
| 8,191,945 | B2 | | 6/2012 | Compton |
| 2002/0151390 | A1 | | 10/2002 | Niksich |
| 2002/0170282 | A1 | | 11/2002 | Edwards |
| 2005/0052040 | A1 | | 3/2005 | Hellerson |
| 2005/0224312 | A1 | | 10/2005 | Farmer |
| 2014/0306471 | A1 | | 10/2014 | Vital |

* cited by examiner

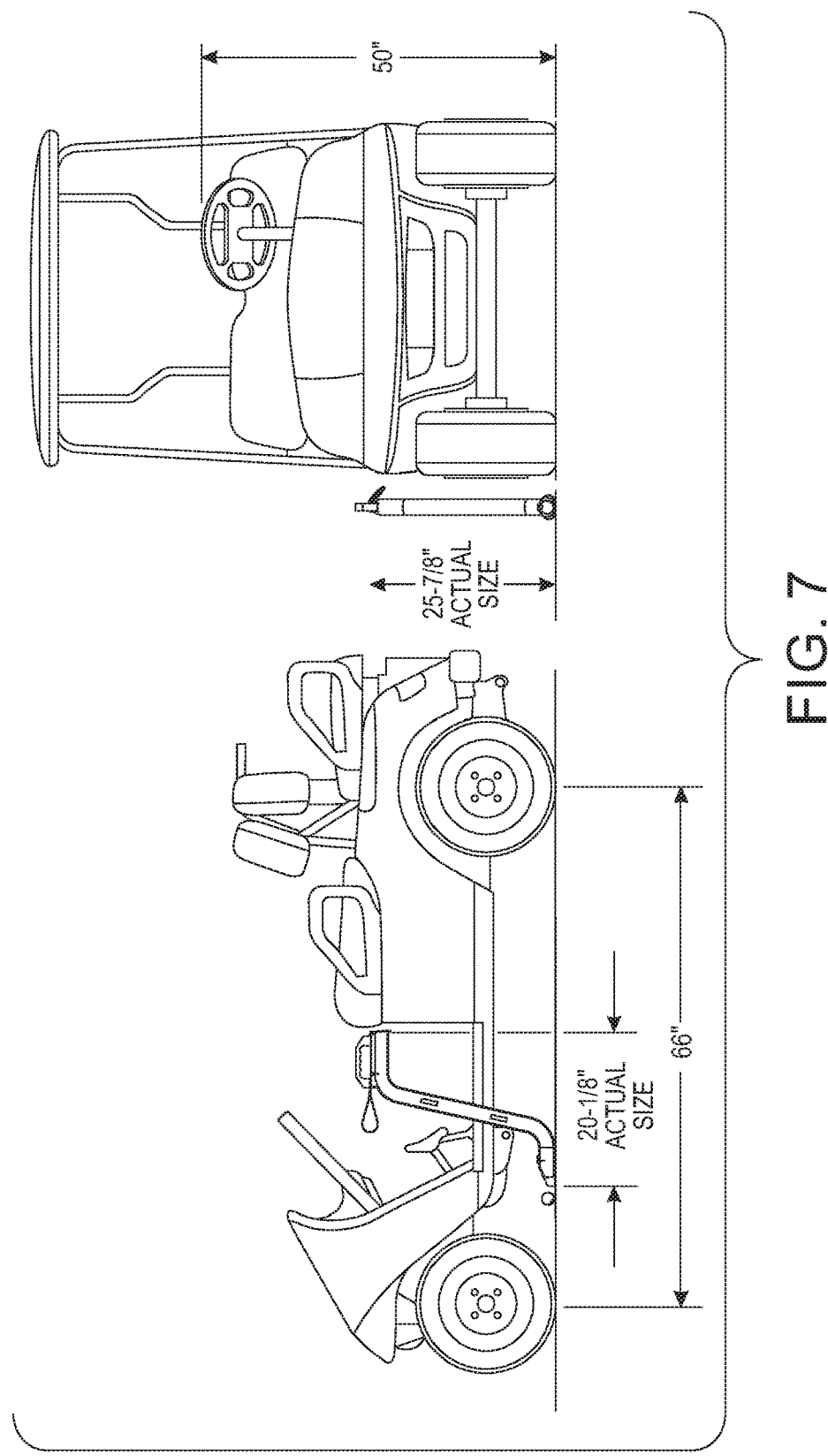

GOLF BALL SCOOP

FIELD OF THE INVENTION

The present invention relates to an apparatus for retrieving, holding, and dispensing balls, preferably golf balls.

BACKGROUND OF THE INVENTION

The picking up of golf balls by hand is difficult for many individuals who wish to play golf, particularly for those individuals for whom a stooping action is bothersome. This task of picking or retrieving the balls requires a considerable amount of bending over, or stooping, in order to reach the balls, which can be hard on the spine and the back muscles. In addition, individuals in golf carts must either get out of the cart and stoop to retrieve the ball or perform various contortive acts to retrieve the ball while still seated.

SUMMARY OF THE INVENTION

The present invention relates to a ball scoop device comprising a hollow transport shaft connected by a lower angled connection to a ball scoop at the lower end of the transport shaft and connected by an upper angled connection at the upper end of the transport shaft to a ball retainer. The present invention also relates to a method of retrieving a ball comprising the steps of providing a ball on a surface, providing a ball scoop device comprising a hollow transport shaft connected by a lower angled connection to a ball scoop at the lower end of the transport shaft and connected by an upper angled connection at the upper end of the transport shaft to a ball retainer, grasping the ball scoop device by the ball retainer, aligning the ball scoop of the ball scoop device with the ball, tilting the ball scoop device at an angle sufficient to move the ball from the ball scoop, through the transport shaft and into the retainer, and removing the ball from the retainer.

BRIEF DESCRIPTION OF THE DRAWINGS

FIG. 7. This figure shows the golf scoop relative to use with a golf cart.

DETAILED DESCRIPTION OF THE INVENTION

The present invention relates to a ball scoop device comprising a tubular transport shaft connected by a lower angled connection to a ball scoop at one end and connected to a ball retainer at the other end by an upper angled connection. The device also stores and dispenses the retrieved balls. Although this device may be used with many different types of balls, especially sports balls, the preferred embodiment described herein is utilized with golf balls.

Figure 1:
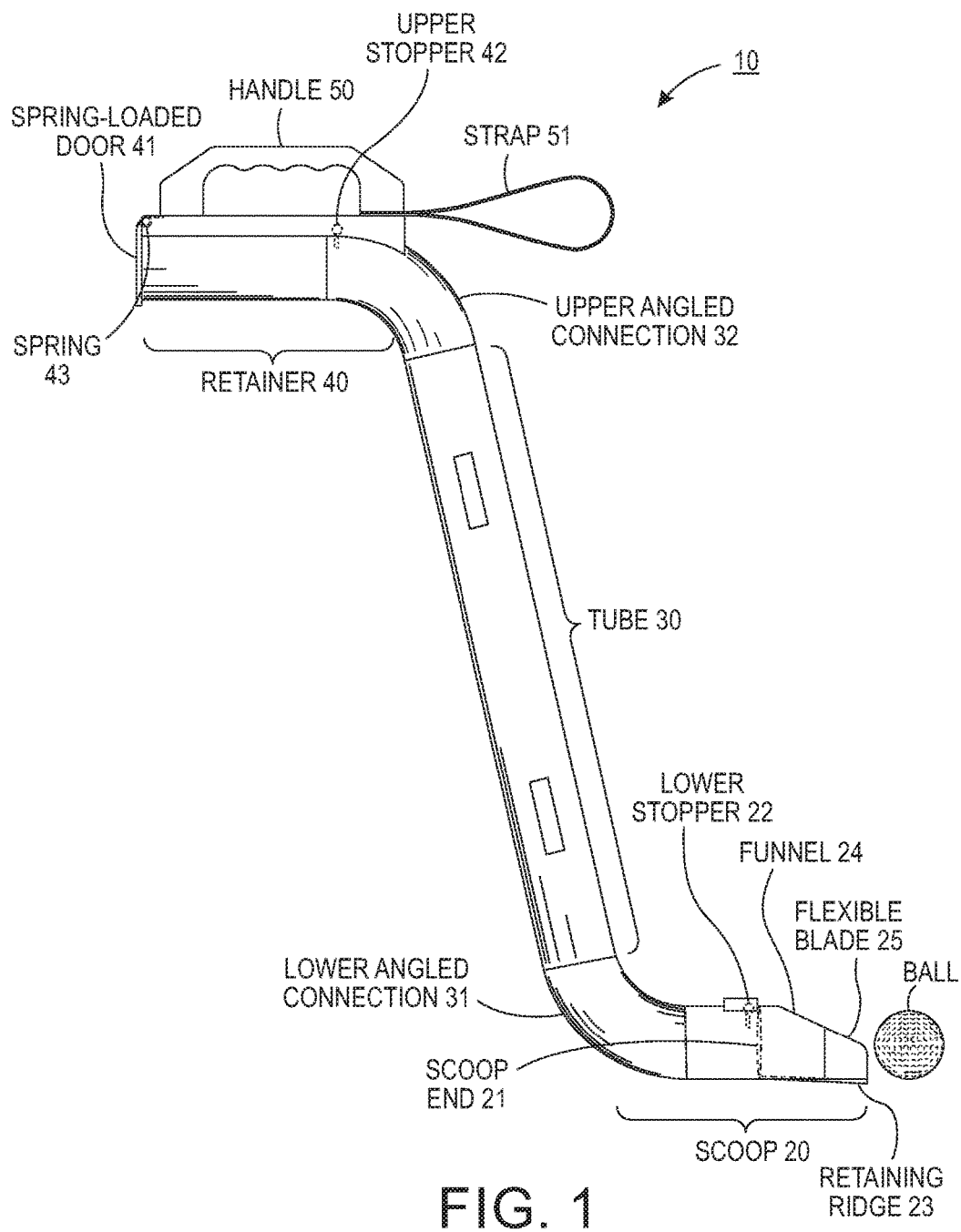
FIG. 1. This figure illustrates a side-view perspective of one embodiment of the golf scoop.

It is contemplated herein that the ball scoop device 10 illustrated in FIG. 1 may be built to scale in order to receive and retain balls of any particular diameter and weight. Suitably, the ball scoop device 10 is preferably tubular and may be configured to receive and retain one type of athletic ball or a plurality of types of athletic balls simultaneously. Suitable athletic balls include but are not necessarily limited to lawns balls such as croquet balls and bocce balls, baseballs, softballs, tennis balls, racquet balls, cricket balls, golf balls, and combinations thereof. The ball scoop device 10 may be configured to receive and retain balls having a diameter greater than the diameters of the balls listed above.

As disclosed above, the ball scoop device comprises a transport shaft connected by a lower angled connection to a ball scoop at one end and connected to a ball retainer at the other end by an upper angled connection.

Tube

The transport shaft 30 as seen in FIG. 1, also referred to herein as the tube, is defined by a hollow tubular shaft and comprises at least one inlet, which functions as a retrieving end, and is angled to connect to one end of the scoop 20. The transport shaft 30 also has an outlet end which is angled to connect to the retainer 40. In one embodiment, the transport shaft 30 may be tubular. In another embodiment, the transport shaft 30 may comprise a cylindrical inner surface and a multi-sided outer surface. In addition, the transport shaft 30 may comprise multi-sided inner and outer surfaces or any other shape capable of passing balls. The transport shaft 30 has a diameter slightly greater than that of the balls to be transported, most preferably, standardized golf balls. The transport shaft 30 also has a curved portion at each end. The angled lower connection 31 of transport shaft 30 connects to the outlet end of scoop 20. The angled upper connection 32 of transport shaft 30 connects to the inlet end of the retainer 40. As a result of the angled lower connection 31 and the angled upper connection 32 attachments to the scoop 20 and retainer 40, the transport shaft maintains an angled position with respect to the ground or other surface from which the ball is retrieved.

Scoop

The scoop 20 is hollow and communicates with the transport shaft via the lower angled connection 31 to pass the golf balls retrieved through the scoop and the tube and, ultimately, to the retainer 40. The scoop 20 is inclined relative to the transport shaft 30 to lie substantially flat on the ground or very closely paralleled to the ground so as to allow the golf balls to enter the scoop 20.

The scoop 20 is connected fixedly to and extends outwardly and downwardly from the transport shaft 30, such that an angle (the lower angled connection 31) is formed between the scoop 20 and the transport shaft 30. In the most preferred embodiment, the angle is about 120°. Preferably, the angle is from 45 to 135°. Although these are the preferred angles, any angle can be used as long as the functionality of the ball scoop device is maintained. Some angle must be maintained; a wholly linear device is not contemplated.

The scoop 20 is preferably elongated, slender, and tubular, but may also comprise any configuration capable of capturing a ball and passing the ball into the tube 30. One end of scoop 20 connects to the lower angled connection 31, the other end is an open end 21 to receive the balls. A lower stopper 22 is optionally positioned just inside the open end to ensure that a ball, once captured, is retained in the scoop 20.

Figure 4:
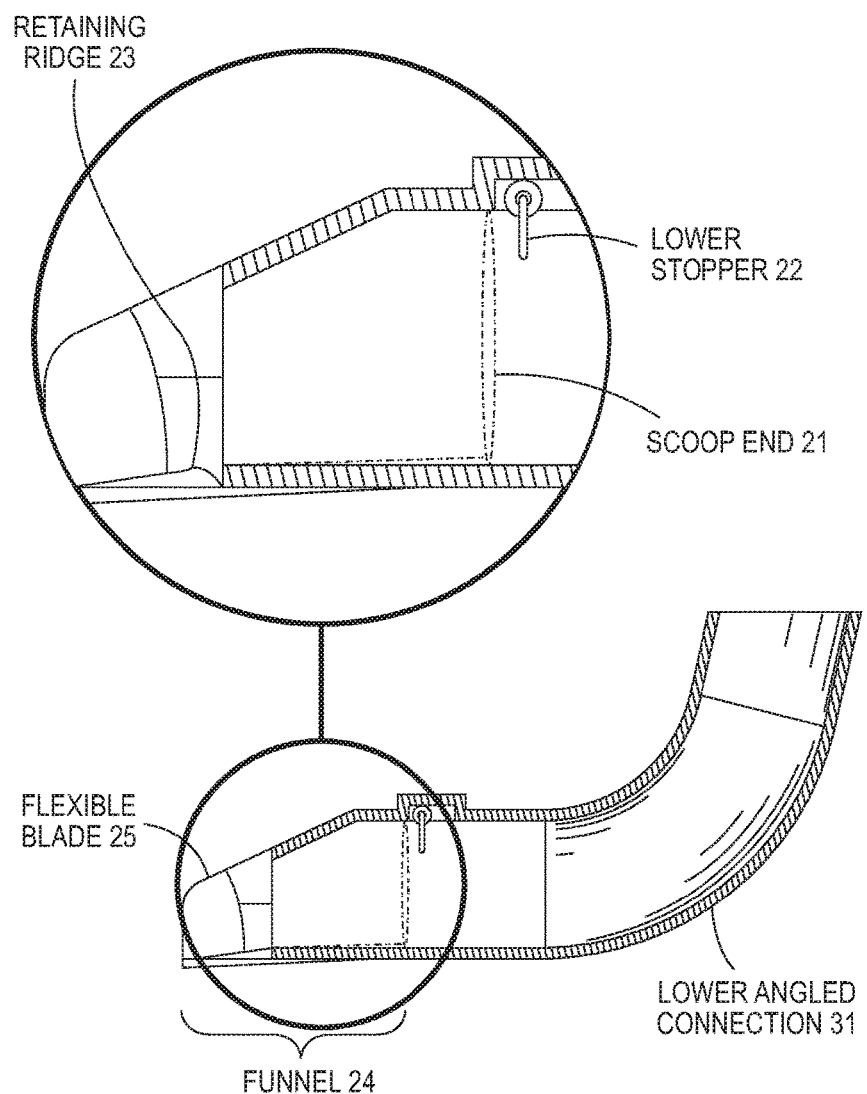
FIG. 4. This figure illustrates a close-up, detailed side view of the scoop end of one embodiment of the golf scoop.

A ball funnel 24, enlarged in FIG. 4, may be attached to the open end 21 of the scoop 20 to facilitate ball capture. The funnel 24 preferably has side walls that extend continuously forward from and are inclined downwardly relative to the scoop 20. The side walls can also be angled outwards to provide a wider opening that narrows to fit the open end 21 of the scoop 20. The funnel 24 also includes a retaining ridge 23 which may extend around any portion of the funnel 24 to maintain the ball in the funnel 24 prior to passage into the open end 21 of the scoop 20 and past the lower stopper 22. The funnel may also include a flexible blade 25. The retaining ridge 23 may be part of the flexible blade 25, the funnel 24 or a combination thereof.

Retainer

Figure 5:
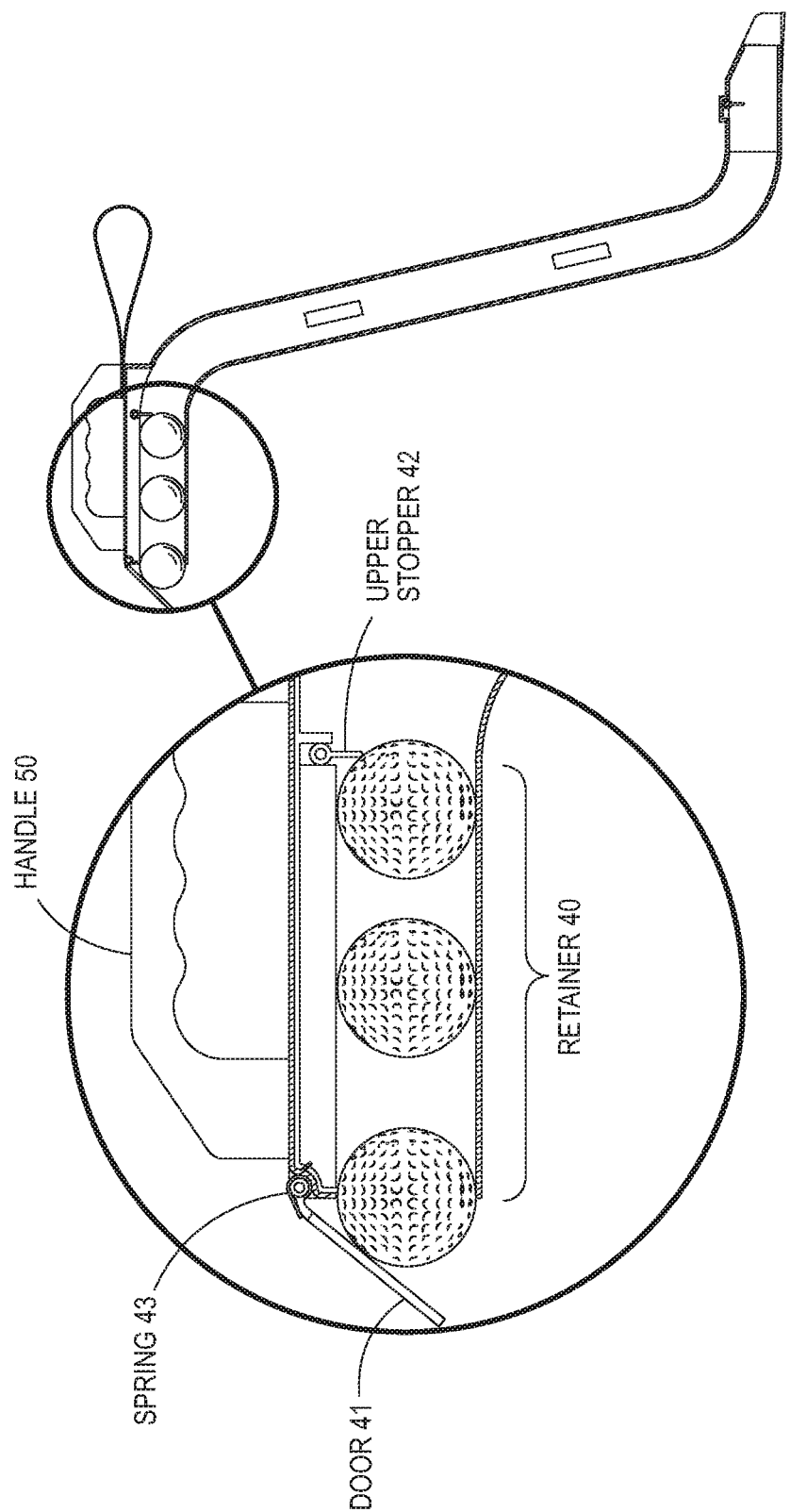
FIG. 5. This figure illustrates a close-up, detailed side view of the retainer end of the golf scoop.

The ball retainer 40, enlarged in FIG. 5, is attached to the tube via upper angled connection 32 to allow balls to pass from the tube into the retainer. The retainer 40 is connected fixedly to and extends outwardly from the transport shaft 30, such that an angle (the upper angled connection 32) is formed between the retainer 40 and the transport shaft 30. In the preferred embodiment, the angle is about 120°. The upper angled connection 31 and the upper angled connection 32 may comprise the same angle or different angles. Preferably, the angle is from 45 to 135°. Although these are the preferred angles, any angle can be used as long as the functionality of the ball scoop device is maintained. Some angle must be maintained; a wholly linear device is not contemplated. The upper and lower angled connections 31 and 32 may also be part of the hollow tubular transport shaft 30 or separate pieces.

The retainer 40 is preferably elongated, slender, and tubular, but may also comprise any configuration capable of capturing a ball, retaining the ball and ultimately passing the ball out of the ball scoop device via door 41. One end of retainer 40 connects to the upper angled connection 32, the other end comprises a closure mechanism, preferably door 41, to allow the retained balls to be removed from the ball scoop device 10 for usage. Preferably, door 41 is spring loaded.

An upper stopper 42 is optionally positioned just inside the retainer 40 at the connection to upper angled connection 32 to ensure that a ball, once captured and passed through tube 30, is retained in the ball retainer 40, making it accessible for removal from the retained by the user. Optional strap 51, handle 50, or other useful attachments may be added to retainer 40.

It should be noted that multiple balls can be retained in scoop 20, tube 30, and retainer 40 at the same time.

Figure 2:
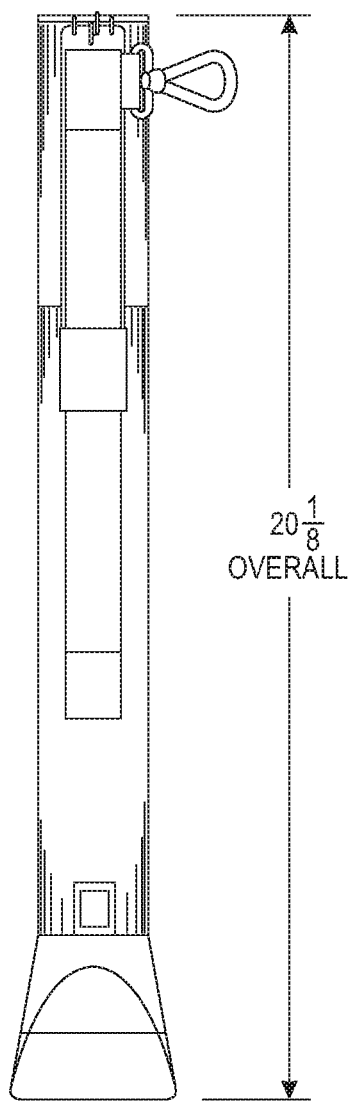
FIG. 2. This figure illustrates a top-down view of one embodiment of the golf scoop.
Figure 3:
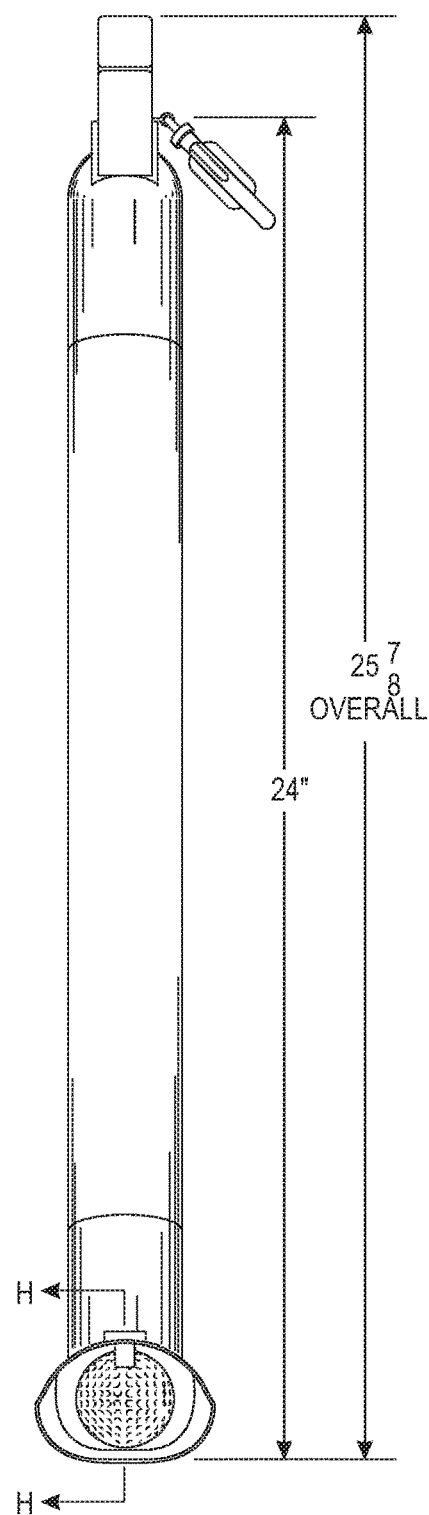
FIG. 3. This figure illustrates a frontal view of one embodiment of the golf scoop.

Further views of the ball scoop device can be seen from the top (FIG. 2) and from the front (FIG. 3). In addition, positioning of the preferred embodiment for use with a golf cart can been seen in FIG. 7.

Materials

The ball scoop device may be constructed of any material durable enough to receive one or more balls from a surface and retain the one or more balls within the device. In particular, the ball scoop device may be constructed of materials including but not necessarily limited to those materials resistant to chipping, cracking, excessive bending and reshaping as a result of ozone, weathering, heat, moisture, other outside mechanical and chemical influences, as well as various impacts and other loads placed on the ball scoop device. Likewise, the ball scoop device may comprise any color or combination of colors, or in the alternative, the ball scoop device may be transparent and translucent depending on individual preferences and needs.

Other suitable materials include but are not necessarily limited to metals, plastics, rubbers, woods, fiberglass, plexiglass, filled composite materials, and combinations thereof. Suitable plastics include, but are not necessarily limited to vinyl polymers and polyvinyl chloride (PVC). Suitable metals may be used, such as aluminum, steel and titanium. In one suitable embodiment, the ball scoop device may be comprised of PVC. In another suitable embodiment, the ball scoop device may be comprised of vinyl polymer. In addition, the ball scoop device may comprise one or more apertures or slits in the housing wall effective to lessen the overall weight of the housing as desired.

Figure 6:
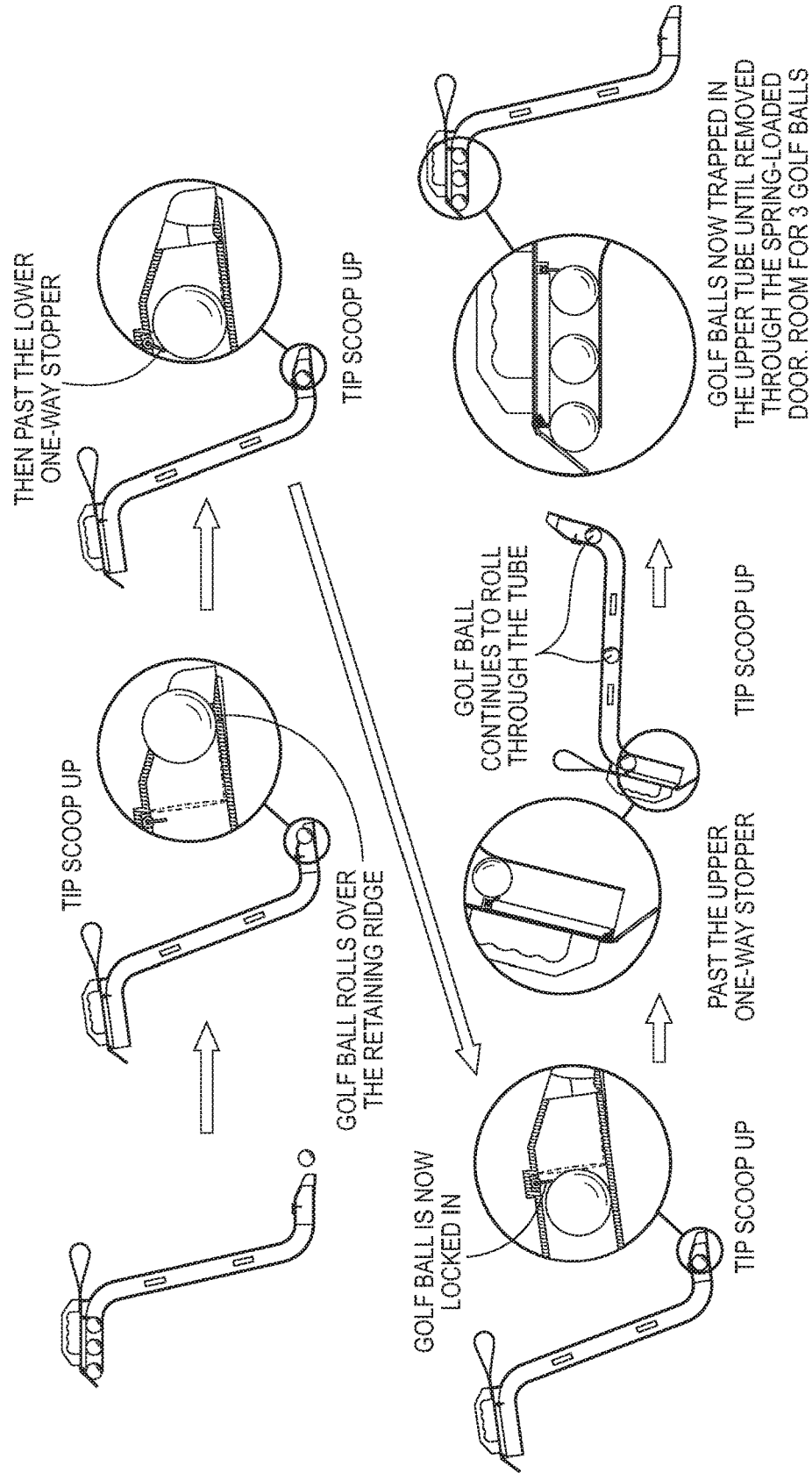
FIG. 6. This figure illustrates the method of using the golf scoop to retrieve and retain golf balls, according to one embodiment of the invention.

The preferred method of use of the ball scoop device is illustrated in FIG. 6. An individual grasps the ball scoop device by the retainer, preferably by a handle connected to the retainer. Usually, the individual is seated, preferably in a golf cart. The scoop end or optional funnel of the ball scoop device is aligned with a ball and parallel to the surface on which the ball rests, typically the ground. The scoop end or funnel of the ball scoop device is slid under the ball, causing the ball to enter the scoop end and pass the lower stopper. The ball scoop device is then tilted to a position sufficient to move the ball from the scoop, through the lower angled connection and the transport shaft and into the retainer. Typically, the ball scoop device is tilted at least parallel to the ground so that the scoop end is up. The ball passes through the tube and the curved upper connection, passing the upper stopper and entering the retainer. The ball is held in the retainer by the upper stopper at one end and the door at the other. Once the user is ready for the ball, the door is opened and the ball is removed from the retainer. These steps may be repeated as necessary. It is also understood that more than one ball may be in the ball scoop device at one time.

In the case of the optional funnel, the ball will enter the funnel and pass over the retaining ridge and remain in the scoop until the ball scoop device is tilted, at which time the ball will pass through the scoop opening and pass the lower stopper, continuing through the tube and the curved upper connection, passing the upper stopper and entering the retainer. If there is sufficient force, the ball may pass the lower stopper as well as the retaining ridge in one step.

The invention claimed is:

1. An athletic ball scoop device comprising a hollow transport shaft connected by a lower angled connection to a ball scoop at a lower end of the transport shaft and connected by an upper angled connection at an upper end of the transport shaft to a ball retainer, wherein said ball scoop has
an open scoop end with an opening greater than a diameter of the athletic ball opposite the lower angled connection;
a lower one-way stopper located between said open scoop end and said lower angled connection; and
a ball funnel attached to said open scoop end opposite said lower angled connection and said lower one-way stopper, wherein said ball funnel comprises
side walls that extend forward from the open scoop end of the ball scoop and are angled outwardly from the open scoop end of the ball scoop to provide an opening that narrows to fit the open scoop end of the ball scoop and
a retaining ridge extending around at least a portion of said ball funnel;

wherein said ball retainer has
an open end opposite the upper angled connection and an upper one-way stopper located between said open end of said ball retainer and said upper angled connection;

and further comprising a handle attached to said ball retainer;

wherein said ball scoop is capable of sliding under the athletic ball while resting on a surface.

2. The ball scoop device of claim 1 wherein the ball funnel further comprises a flexible blade at an end of said ball funnel opposite said open scoop end.

3. The ball scoop device of claim 1 wherein the open end is blocked by a closure mechanism.

4. The ball scoop device of claim 3 wherein the closure mechanism is a spring loaded door.

5. The ball scoop device of claim 1 wherein the upper angled connection and the lower angled connection comprise at least one angle of from 45 to 135°.

6. A method of retrieving a golf ball comprising:
  a. providing a golf ball on a ground surface;
  b. providing a golf ball scoop device comprising a hollow transport shaft connected to a lower angled connection to a ball scoop at a lower end of the transport shaft and connected to an upper angled connection at an upper end of the transport shaft to a ball retainer, wherein the ball scoop has an open scoop end opposite the lower angled connection and having a diameter greater than that of the golf ball, wherein the retainer has an open end opposite the upper angled connection, and wherein said ball scoop is capable of sliding under the golf ball;
  c. grasping the ball scoop device by the ball retainer;
  d. aligning the ball scoop of the golf ball scoop device with the golf ball;
  e. sliding the ball scoop under the golf ball, causing the golf ball to enter the scoop;
  f. tilting the golf ball scoop device at an angle sufficient to move the golf ball from the ball scoop, through the transport shaft and into the retainer; and
  g. removing the golf ball from the retainer.

7. The method of claim 6 wherein said golf ball scoop device further comprises a ball funnel attached to the open end of the ball scoop, wherein the ball funnel has side walls that extend forward from the open end and are angled outwards from the open end of the ball scoop to provide an opening that narrows to fit the open end of the ball scoop.

8. The method of claim 6 further comprising holding the golf ball in the retainer.

9. The method of claim 6 wherein the aligning is essentially parallel to the surface.

10. The method of claim 6 further comprising providing a user being seated prior to grasping the ball scoop device.

* * * * *